(12) United States Patent
Gaskill et al.

(10) Patent No.: US 11,995,344 B2
(45) Date of Patent: May 28, 2024

(54) MEMORY WITH EFFICIENT STORAGE OF EVENT LOG DATA

(71) Applicant: Micron Technology, Inc., Boise, ID (US)

(72) Inventors: Steven Gaskill, Campbell, CA (US); Joe G. Mendes, Santa Cruz, CA (US)

(73) Assignee: Micron Technology, Inc., Boise, ID (US)

( * ) Notice: Subject to any disclaimer, the term of this patent is extended or adjusted under 35 U.S.C. 154(b) by 65 days.

(21) Appl. No.: 17/749,128

(22) Filed: May 19, 2022

(65) Prior Publication Data
US 2023/0409231 A1 Dec. 21, 2023

(51) Int. Cl.
*G06F 3/06* (2006.01)
*G06F 12/02* (2006.01)

(52) U.S. Cl.
CPC .......... *G06F 3/0655* (2013.01); *G06F 3/0604* (2013.01); *G06F 3/0656* (2013.01); *G06F 3/0679* (2013.01); *G06F 12/0246* (2013.01); *G06F 2212/7203* (2013.01); *G06F 2212/7207* (2013.01)

(58) Field of Classification Search
None
See application file for complete search history.

(56) References Cited

U.S. PATENT DOCUMENTS

| | | | | |
|---|---|---|---|---|
| 2005/0138111 A1* | 6/2005 | Aton | ................... | G06F 11/3476 709/201 |
| 2006/0079333 A1* | 4/2006 | Morrow | ................... | A63F 13/90 463/43 |
| 2006/0253645 A1* | 11/2006 | Lasser | ................... | G06F 12/0246 711/E12.008 |
| 2014/0298041 A1* | 10/2014 | Consalus | .............. | G06F 21/602 713/193 |
| 2019/0129774 A1* | 5/2019 | Konan | ................. | G06F 11/0778 |
| 2021/0303213 A1* | 9/2021 | Kato | ..................... | G06F 3/0656 |
| 2022/0374417 A1* | 11/2022 | Danilov | ................ | G06F 16/215 |
| 2023/0075820 A1* | 3/2023 | Park | ...................... | G06F 3/0656 |

FOREIGN PATENT DOCUMENTS

| | | | | |
|---|---|---|---|---|
| JP | 2012208646 A | * | 10/2012 | |
| KR | 10-2023-0037255 | * | 3/2023 | .............. G06F 11/34 |

OTHER PUBLICATIONS

Translation of JP-2012208646-A.*
Translation of KR 10-2023-0037255.*
NVM Express. "NVM Express Base Specification." Jun. 2019. Rev. 1.4. pp. 138-155.*

\* cited by examiner

*Primary Examiner* — Nathan Sadler
(74) *Attorney, Agent, or Firm* — Perkins Coie LLP

(57) ABSTRACT

Memory with efficient storage of event log data is disclosed herein. In one embodiment, a memory device includes a non-volatile memory subsystem storing a persistent event log file, and a volatile memory subsystem including a working buffer. The memory device is configured to write newly generated event log data of the memory device to the working buffer. The memory device is further configured to write the newly generated first event log data to a first subregion of the persistent event log file. The first subregion can be one of a plurality of subregions of the persistent event log file, and can correspond to an end of event log data stored to the persistent event log file. The volatile memory subsystem can be positioned inside or outside a controller operably connected to the non-volatile memory subsystem.

20 Claims, 5 Drawing Sheets

MEMORY WITH EFFICIENT STORAGE OF EVENT LOG DATA

TECHNICAL FIELD

The present disclosure is related to memory systems, devices, and associated methods. For example, several embodiments of the present disclosure are directed to memory devices and associated methods for efficiently storing event log data.

BACKGROUND

Memory devices are widely used to store information related to various electronic devices such as computers, wireless communication devices, cameras, digital displays, and the like. Memory devices are frequently provided as internal, integrated circuits and/or as part of external removable devices in computers or other electronic devices. There are many different types of memory, including volatile and non-volatile memory. Volatile memory, including static random-access memory (SRAM), dynamic random-access memory (DRAM), and synchronous dynamic random-access memory (SDRAM), among others, may require a source of applied power to maintain its data. Non-volatile memory, by contrast, can retain its stored data even when not externally powered. Non-volatile memory is available in a wide variety of technologies, including flash memory (e.g., NAND and NOR), phase change memory (PCM), ferroelectric random-access memory (FeRAM), resistive random access memory (RRAM), and magnetic random-access memory (MRAM), among others. Improving memory devices, generally, may include increasing memory cell density, increasing performance (e.g., read, write, erase speeds) or otherwise reducing operational latency, increasing reliability, increasing data retention, reducing power consumption, or reducing manufacturing costs, or reducing dimensional attributes, among other metrics.

BRIEF DESCRIPTION OF THE DRAWINGS

The disclosure will be understood more fully from the detailed description given below and from the accompanying drawings of various embodiments of the disclosure. The components in the drawings are not necessarily to scale. Instead, emphasis is placed on illustrating clearly the principles of the present technology. The drawings should not be taken to limit the disclosure to the specific embodiments, but are for explanation and understanding only.

DETAILED DESCRIPTION

Figure 1:
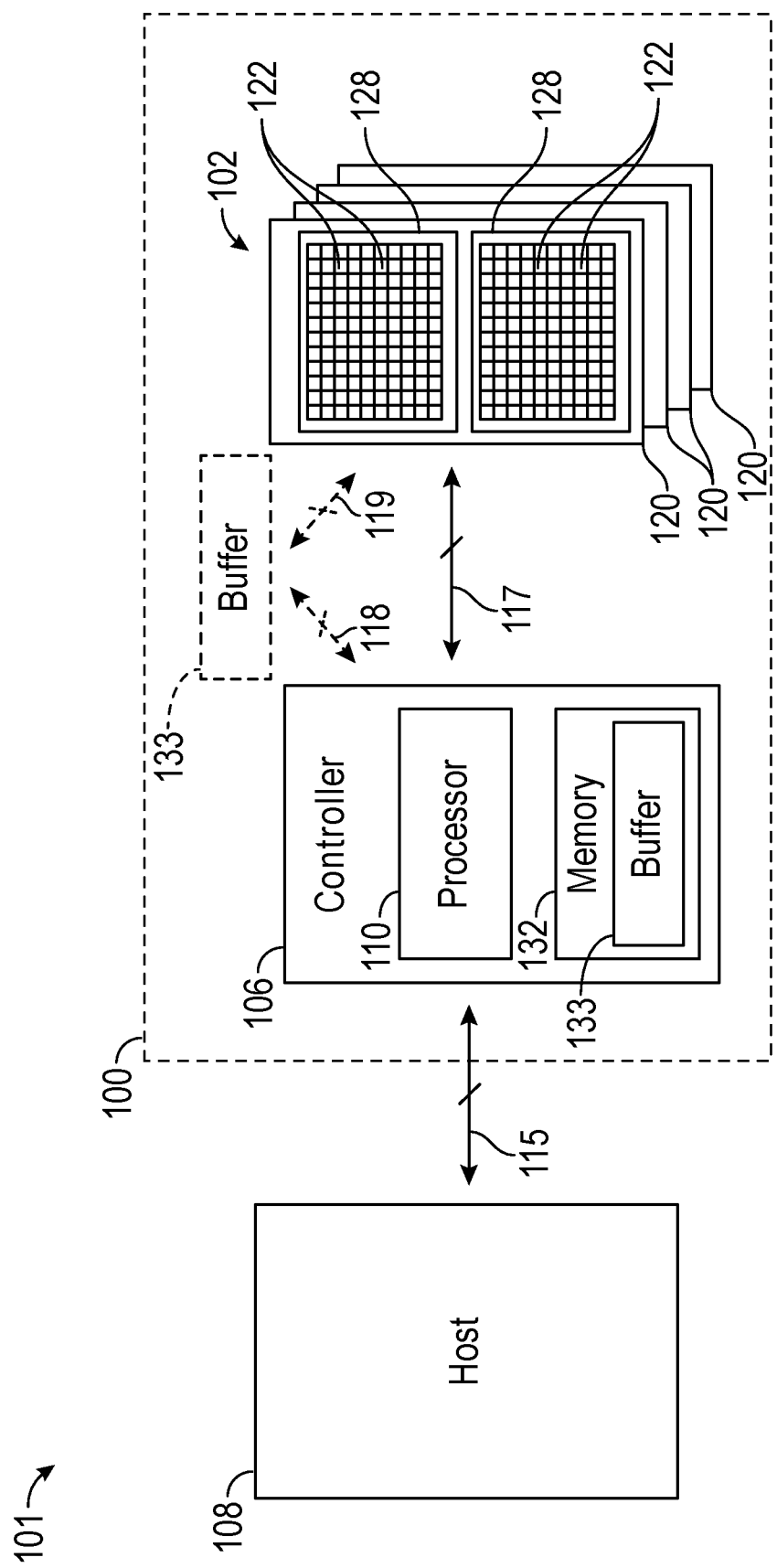
FIG. 1 is a partial schematic block diagram of a system having a memory device configured in accordance with various embodiments of the present technology.

As discussed in greater detail below, the technology disclosed herein relates to memory systems and devices, and associated methods for efficiently storing event log data. In the illustrated embodiments below, the memory devices are primarily described in the context of devices incorporating NAND-based storage media (e.g., NAND flash). Memory devices configured in accordance with other embodiments of the present technology, however, can include other types of memory devices (e.g., hard disk drives, phase change memory, ferroelectric, etc.) and/or can include main memories that are not NAND-based (e.g., that are NOR-based) or only partially NAND-based. Moreover, memory devices configured in accordance with still other embodiments of the present technology can include volatile memories, such as DRAM and/or SRAM memories. In still other embodiments of the present technology, the technology disclosed herein can be used in other systems (e.g., semiconductor systems) besides memory systems, that store event log data. Such other systems are within the scope of the present technology. A person skilled in the art will understand that the technology may have additional embodiments and that the technology may be practiced without several of the details of the embodiments described below with reference to FIGS. 1-4.

As used herein, event log data refers to information about (or otherwise relating to) usage and operation of a memory device or other system. For example, event log data can include automatically produced and/or time-stamped documentation of events occurring on or relevant to a memory device or memory system. Such event log data is stored in an event log file. An event log file, as used herein, refers to an amount of memory allocated specifically for storing event log data. Event log data is distinguished from payload data (e.g., regular data, user data, etc.) that is received from or written by a source (e.g., a host device) outside of a memory device or other system.

A. OVERVIEW

Many memory devices include event logging algorithms to record event log data to a persistent file. These event logging algorithms are typically designed for optimal data density or minimum run-time overhead, but not both. For example, each time event logging algorithms favoring optimal data density are employed to write new event log data to a persistent file, the event logging algorithms typically first read out event log data from the persistent file to determine an end of the event log data in the persistent file. This enables such event logging algorithms to better consolidate event log data within the persistent file at the time of writing new event log data to the file. But reading out the event log data each time the event logging algorithms are employed to store new event log data to the persistent file occupies system resources and increases the run-time overhead of the event logging algorithms. Thus, such event logging algorithms are not optimal for, and are typically not used in, resource-critical memory systems or devices.

For this reason, event logging algorithms favoring minimum run-time overhead are typically employed in resource-critical memory systems or devices. More specifically, when writing incremental event log data to a persistent file, event logging algorithms favoring minimum run-time overhead typically use data padding (e.g., writing an amount of data to a section of memory that is often larger than required to store the amount of data). This enables the event logging algorithms to, without first reading event log data out of the persistent file, quickly write new event log data to a persistent file without concern of overwriting valid event log data already stored to the file. But such an approach often results in low storage efficiency (e.g., as low as two percent)

because the event log data is often not consolidated within the persistent file at the time it is written, and a large amount of wasted or unutilized space from the data padding accumulates across the entire persistent file. In turn, such an approach commonly results in higher storage costs because additional storage space must often be allocated to a persistent file to store additional event log data.

To address these concerns, the present technology is directed to memory systems and devices that employ a method of storing event log data to an event log file (a persistent file) with both optimal data density and minimal or reduced run-time overhead. More specifically, the present technology utilizes an event log file that can comprise a plurality of subsections or file chunks, with each file chunk being individually or separately referenceable by one or more indices. In some embodiments, the present technology can track, using a current file chunk index, a current file chunk of the event log file that corresponds to an end portion of event log data stored to the event log file. In these and other embodiments, event log data currently stored in the current file chunk (if any) can be (e.g., upon power up of the memory device) read into a buffer of memory, and the buffer can be scanned to identify an end of the event log data in the buffer and to set an accumulator pointer to reference the end of the event log data. As new event log data is generated, the new event data can be written to the buffer and (e.g., then) to the current file chunk of the event log file, and the accumulator pointer can be updated to reference a new end of the event log data stored to the buffer. When the buffer is filled with event log data and after the event log data in the buffer is written to the current file chunk, the buffer and/or the accumulator location pointer can be reset, the current file chunk index can be updated to reference a next file chunk of the event log file, and the next file chunk can be used to store newly generated event log data.

In this manner, the present technology utilizes one or more indices to track an end of event log data in an event log file, thereby obviating the practice of reading event log data out of the event log file before each write of new event log data to the event log file. In addition, the present technology utilizes a buffer to consolidate event log data in an event log file at the time the event log data is written to the event log file, thereby obviating the practice of writing event log data to the event log file with data padding. In other words, the present technology is expected to achieve optimal event log data density in the event log file (a) while minimizing or reducing the run-time overhead in comparison to other event logging algorithms that favor optimal data density, and (b) while reducing overall storage costs in comparison to other event logging algorithms that favor minimizing run-time overhead.

B. SELECTED EMBODIMENTS OF MEMORY SYSTEMS AND DEVICES WITH EFFICIENT EVENT LOG STORAGE, AND ASSOCIATED METHODS

FIG. 1 is a block diagram of a memory system 101 having a memory device 100 configured in accordance with embodiments of the present technology. An example of a memory device 100 is a storage system, such as a solid-state drive (SSD). In some embodiments, the memory device 100 is a hybrid memory/storage sub-system.

As shown, the memory device 100 includes a main memory 102 (e.g., a memory array) and a controller 106 (e.g., a processing device) operably coupling the main memory 102 to a host device 108 (e.g., an upstream central processor (CPU)). The main memory 102 can include a plurality of memory regions, or memory units 120, which include a plurality of memory cells 122. Memory units 120 can be individual memory dies, memory planes in a single memory die, a stack of memory dies vertically connected with through-silicon vias (TSVs), or the like. In one embodiment, each of the memory units 120 can be formed from a semiconductor die and arranged with other memory unit dies in a single device package (not shown). In other embodiments, one or more of the memory units 120 can be co-located on a single die and/or distributed across multiple device packages.

The memory cells 122 can include, for example, NAND flash and/or other suitable storage elements (e.g., NOR flash, read only memory (ROM), electrically erasable programmable ROM EEPROM, erasable programmable ROM (EPROM), ferroelectric, magnetoresistive, phase change memory, etc.) configured to store data persistently or semi-persistently. In one example, the memory cells 122 are arranged in memory pages that are arranged in memory blocks 128. Continuing with this example, the memory blocks 128 can be arranged in memory planes, and the memory planes can be arranged in memory dies. As a specific example, the memory cells 122 can include NAND flash storage elements arranged in a 3D NAND topology, configuration, or architecture. The main memory 102 and/or the individual memory units 120 can also include other circuit components or memory subsystems (not shown), such as multiplexers, decoders, buffers, read/write drivers, address registers, data out/data in registers, etc., for accessing and/or programming (e.g., writing) the memory cells 122 and other functionality, such as for processing information and/or communicating with the controller 106 via a device bus 117.

As discussed in greater detail below, a region (e.g., a memory unit 120, a memory block 128, a memory page, memory cells 122) of the main memory 102 can be allocated to storing event log data and/or related information (e.g., an accumulator location pointer, a current file chunk index, a new file chunk index, etc.). Various pointers and indexes are described in detail below with reference to FIG. 2. The region of the main memory 102 allocated to storing event log data can be referred to herein as an 'event log file' or 'file.' An event log file can include or be divided into a plurality of subregions or subsets of memory. The subregions can each be referred to herein as a 'file chunk.' The amount of memory included in file chunks of an event log file can be equal or can differ from one another. As a specific example, an event log file can correspond to a memory block 128 of the main memory 102, and each file chunk of the event log file can correspond (a) to a memory page of the memory block 128 or (b) to a subset (e.g., a logical subset) of a memory page included in the memory block 128. In some embodiments, each of the file chunks are separately or individually addressable (e.g., for reading event log data from or for writing event log data to a respective file chunk).

The controller 106 of FIG. 1 can be a microcontroller, special purpose logic circuitry (e.g., a field programmable gate array (FPGA), an application specific integrated circuit (ASIC), etc.), or another suitable processor. The controller 106 can include a processor 110 configured to execute instructions stored in memory. The processor 110 can be a processing device. In operation, the controller 106 can directly read, write, or otherwise program (e.g., erase) the various memory regions of the main memory 102, such as by reading from and/or writing to groups of memory cells 122 (e.g., memory pages, stripes of memory pages, memory blocks 128, etc.).

In the illustrated example, the controller 106 includes an embedded memory 132 configured to store various processes, logic flows, and routines for controlling operation of the memory device 100, including managing the main memory 102 and handling communications between the memory device 100 and the host device 108. In some embodiments, the embedded memory 132 can include memory registers storing, for example, memory pointers, fetched data, etc. The embedded memory 132 can also include read-only memory (ROM) for storing micro-code.

As shown, the embedded memory 132 includes a buffer 133. The buffer 133 can be volatile memory (e.g., SRAM) in some embodiments. As a specific example, the buffer 133 can be a portion of working memory that services firmware. Alternatively, the buffer 133 can be positioned outside of the controller 106 and/or the main memory 102. For example, the buffer 133 can be positioned in or on an external volatile memory device (not shown), such as a DRAM device that is positioned on a printed circuit board (not shown) connected to the controller 106 and/or to the main memory 102. In embodiments in which the buffer 133 is positioned outside of the controller 106, the controller 106 can communicate with the buffer 133 via a device bus 118, and/or the main memory 102 can communicate with the buffer 133 via a device bus 119. The buffer 133 can be referred to herein as a 'working buffer.'

The buffer 133 is configured to temporarily store event log data relating to the memory device 100. Additionally, or alternatively, the buffer 133 and/or other volatile memory of the memory device 100 can be configured to store various pointers or indexes (e.g., an accumulator location pointer, a current file chunk index, a next file chunk index, etc.) that facilitate efficiently storing event log data in the main memory 102, as discussed in greater detail below. In some embodiments, an amount of memory included in (e.g., a storage capacity of) the buffer 133 can correspond to an amount of memory included in a file or file chunk of the main memory 102. For example, if a file corresponds to a memory block 128 of the main memory 102 and a file chunk corresponds to a memory page of the memory block 128, then the buffer 133 can include an amount of memory that is greater than or equal to a memory page of the memory block 128. As another example, if a file chunk corresponds to a logical subset of a memory page of the main memory 102, then the buffer 133 can include an amount of memory that is greater than or equal to an amount of memory in the logical subset of the memory page.

As shown, the controller 106 communicates with the host device 108 over a system bus 115. In some embodiments, the host device 108 and the controller 106 can communicate over a serial interface, such as a serial attached SCSI (SAS), a serial AT attachment (SATA) interface, a peripheral component interconnect express (PCIe), or other suitable interface (e.g., a parallel interface). The host device 108 can send various requests (in the form of, e.g., a packet or stream of packets) to the controller 106. A request can include a command to write, erase, read or return information, and/or to perform a particular operation (e.g., a TRIM operation). In some embodiments, the host device 108 can send various vendor specific (VS) commands to perform one or more restricted operations (e.g., access a restricted region of the main memory 102, enter a debugging mode, reset restricted data, etc.).

Figure 2:
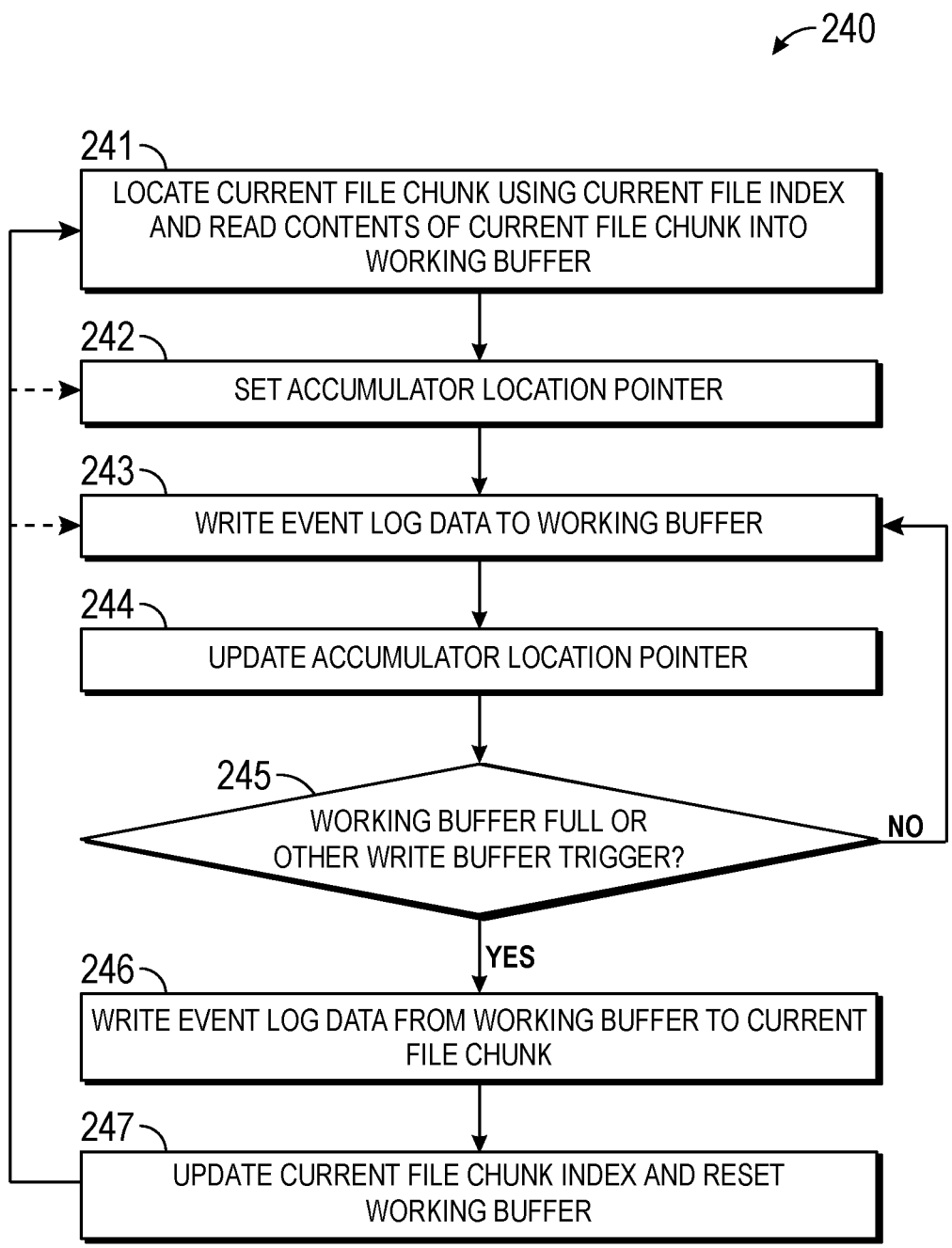
FIG. 2 is a flow diagram illustrating a method of storing event log data in accordance with various embodiments of the present technology.

FIG. 2 is a flow diagram illustrating a routine 240 for storing event log data to an event log file on a memory device in accordance with various embodiments of the present technology. The routine 240 is illustrated as a series of blocks or steps 241-247 in FIG. 2. In some embodiments, all or a subset of one or more of the blocks of the routine 240 can be executed by various components of a memory system, such as the memory system 101 of FIG. 1. For example, all or a subset of one or more blocks of the routine 240 can be executed by a host device, a memory controller, a memory device, a controller, a working buffer, a main memory, and/or other components of the memory system. Furthermore, any one or more of the blocks of the routine 240 can be executed in accordance with the discussion above and/or in accordance with the discussion of FIGS. 3A-4 below. For the sake of clarity and understanding, several steps of the routine 240 are discussed in detail below with reference to FIGS. 3A-3E that illustrate (a) the buffer 133 of FIG. 1, (b) an event log file 350 of the main memory 102 of FIG. 1, (c) a file chunk 369 (FIGS. 3A-3D) of the event log file 350, and (d) a file chunk 370 (FIG. 3E) of the event log file 350.

At block 241, the routine 240 of FIG. 2 begins by locating a current file chunk of an event log file and reading the contents of the current file chunk into a working buffer. The current file chunk can be a file chunk of the event log file that (a) includes unutilized portions of the event log file, (b) includes a physical or logical end portion of event log data currently stored to the event log file, and/or (c) is physically or logically positioned at or proximate the physical or logical end portion of the event log data in the event log file. In some embodiments, locating the current file chunk includes locating the current file chunk using a current file chunk index stored on the memory device. The current file chunk index can be a pointer that references the location of the current file chunk in the event log file and/or in the main memory of the memory device. In some embodiments, the current file chunk index can be stored in non-volatile memory (e.g., the main memory) of the memory device such that the current file chunk index can persist in the non-volatile memory after the memory device is powered down. In these and other embodiments, the current file chunk index can be stored in volatile memory of the memory device. For example, the routine 240 (a) can scan the main memory to locate a current file chunk of the event log file (e.g., by locating an end of the event log data); (b) can set the current file chunk index to reference the identified current file chunk; and/or (c) can store the current file chunk index in volatile memory. After locating the current file chunk, the routine 240 can read (e.g., move or copy) event log data currently stored to the current file chunk into the working buffer. Reading event log data currently stored to the current file chunk into the working buffer (a) can provide an indication of how much event log data is current stored to the current file chunk (e.g., an indication of how much of the current file chunk remains unutilized) and (b) can facilitate consolidating event log data in the current file chunk as new event log data is generated. In some embodiments, the routine 240 can perform all or a subset of block 241 upon power up of the memory device, such as during initialization of the memory device.

Figure 3A:
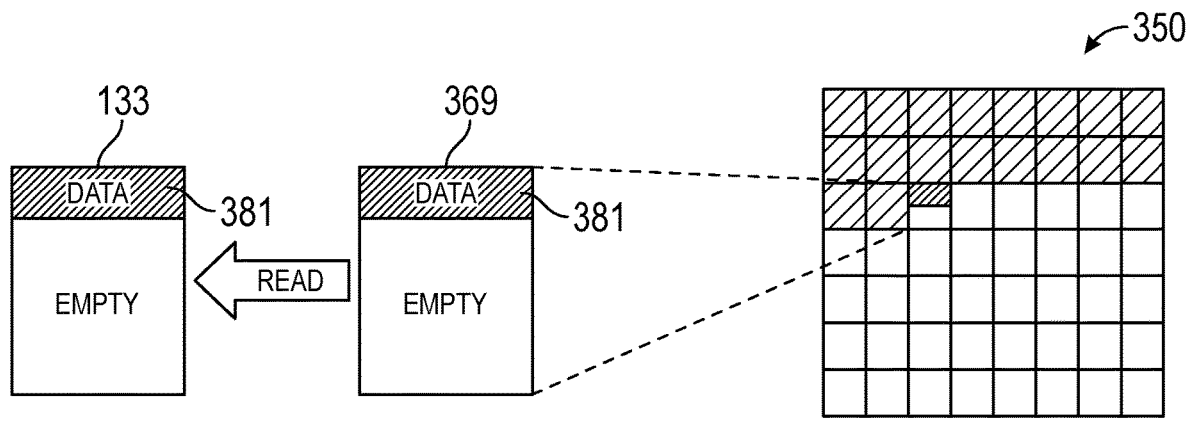
FIGS. 3A-3E are partial schematic diagrams of a buffer and an event log file of a memory device at various stages of storing event log data, in accordance with various embodiments of the present technology.
Figure 3B:
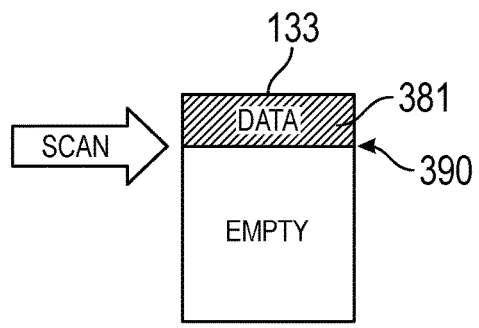

Referring to FIG. 3A for the sake of clarity, file chunk 369 of the event log file 350 corresponds to the current file chunk. For example, each of the file chunks illustrated above and to the left of the file chunk 369 in the event log file 350 are illustrated as being fully shaded to indicate that these file chunks are fully utilized (e.g., fully programmed with event log data). The file chunk 369, by contrast, is only partially shaded to indicate that the file chunk 369 is only partially utilized (e.g., partially programmed with event log data). In particular, event log data 381 is currently stored to the file chunk 369. The remainder of the file chunk 369 is unutilized and/or does not currently store (e.g., valid or non-stale) event log data. Thus, the file chunk 369 corresponds to an end of the event log data currently stored in the event log file 350.

At block 241 of FIG. 2, the routine 240 can identify the file chunk 369 of FIG. 3A as the current file chunk (e.g., using a current file chunk index) and can read the event log data 381 into the buffer 133. In the illustrated embodiment, the storage capacity of the buffer 133 corresponds to the storage capacity of the file chunk 369. Thus, the event log data 381 read into the buffer 133 occupies a same or similar amount of memory in the buffer 133 as the event log data 381 occupies in the file chunk 369.

At block 242, the routine 240 of FIG. 2 continues by setting an accumulator location pointer. The accumulator location pointer can be used to reference a physical or logical end of event log data stored in the buffer 133. For example, referring to FIG. 3B, the routine 240 sets an accumulator location pointer 390 to reference an end of the event log data 381 after the event log data 381 is read into the buffer 133 at block 241 (FIG. 2). In some embodiments, the routine 240 sets the accumulator location pointer by scanning the working buffer 133 to identify an end of the event log data stored to the buffer 133. In these embodiments, the routine 240 can store the accumulator location pointer in volatile memory for future reference. In other embodiments, the accumulator location pointer can be stored to non-volatile memory (e.g., in the main memory). For example, the accumulator location pointer can be stored to non-volatile memory each time the accumulator location pointer is set or updated, or before or during power down of the memory device. Storing the accumulator location pointer in non-volatile memory can enable the routine 240 at block 242 to retrieve the accumulator location pointer from the non-volatile memory (e.g., upon power up of the memory device) in lieu of scanning the buffer 133 and setting the accumulator location pointer. In some embodiments, the routine 240 can perform all or a subset of block 242 upon power up of the memory device, such as during initialization of the memory device.

Figure 3C:
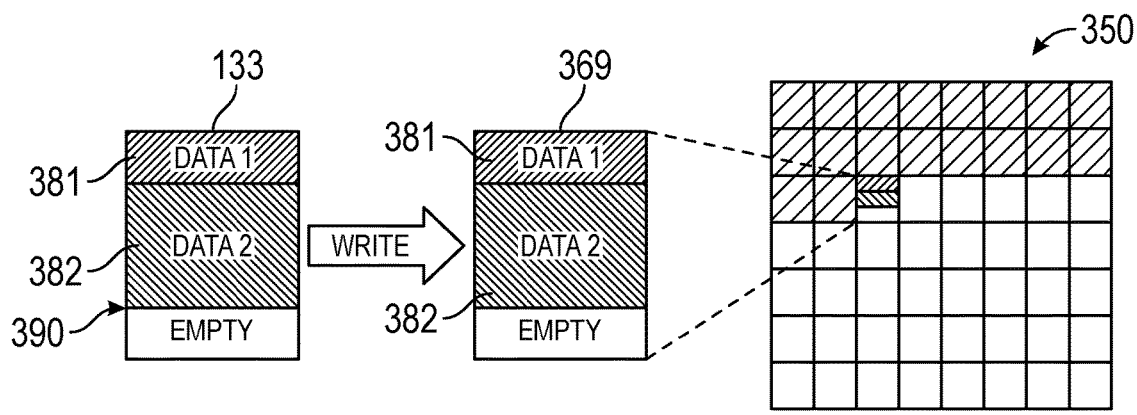

At block 243, the routine 240 continues by writing event log data to the working buffer. The event log data can be newly generated event log data of the memory device. Referring to FIG. 3C, for example, as new event log data 382 is generated, the event log data 382 can be written to the buffer 133 starting at or based on the location in the buffer 133 referenced by the accumulator location pointer 390. Thus, the event log data 381 and the new event log data 382 can be consolidated within the buffer 133 at the time the new event log data 382 is written to the buffer 133.

At block 244, the routine 240 continues by updating the accumulator location pointer. The routine 240 can update the accumulator location pointer in a manner similar to how the routine 240 sets the accumulator location pointer at block 242. For example, the routine 240 can scan the buffer 133 to identify a location of an end of the event log data in the buffer 133. Referring to FIG. 3C, for example, the routine 240 can scan the buffer 133 to identify an end of the new event log data 382 in the buffer 133. After the routine 240 determines an end of the event log data 382 in the working buffer 133, the routine 240 can update the accumulator location pointer 390 to reference to the end of the event log data 382. In some embodiments, the routine 240 can store the updated accumulator location pointer 390 in volatile or non-volatile memory for future reference.

At block 245, the routine 240 continues by determining whether the working buffer is full or whether one or more other write buffer triggers have occurred. In some embodiments, the routine 240 can determine whether the working buffer is full using the updated accumulator location pointer from block 244. For example, the routine 240 can determine that the working buffer is full if the updated accumulator location pointer references an end of the working buffer or references a location of the working buffer within a threshold offset from the end of the working buffer. Otherwise, the routine 240 can determine that the working buffer is not full.

In some embodiments, write buffer triggers can include the occurrence of one or more events. Such events can include a specified or scheduled amount of time elapsing after new event log data is written to the working buffer. For example, the routine 240 can determine that a write buffer trigger has occurred (block 245: Yes) when a specified amount of time has elapsed after new event log data (e.g., the event log data 382 of FIG. 3C) is written to the working buffer. In these and other embodiments, such events can include a specified or threshold amount of event log data written to the working buffer. For example, the routine 240 can determine that a write buffer trigger has occurred (block 245: Yes) when an amount of new event log data (e.g., a size of the event log data 382 of FIG. 3C) meets or exceeds the specified or threshold amount and/or when a sum amount of event log data (e.g., an amount of data representing the event log data 381 and the event log data 382 of FIG. 3C) written to the working buffer meets or exceeds the specified or threshold amount. Additionally, or alternatively, such events can include the occurrence of a power down, restart, power loss, error, and/or panic event of the memory device. For example, the routine 240 can determine that a write buffer trigger has occurred (block 245: Yes) when the memory device is powering down, being restarted, has lost its connection to power, and/or is experiencing an error or panic event. In these and still other embodiments, such events can include receipt of a request (e.g., from the controller and/or the host device) for event log data in the event log file, the occurrence of a specified number of read or write cycles, a determination that the memory device is idle, and/or a determination that there are memory device resources available to write the event log data from the buffer to the current file chunk. In some embodiments, such events can include new event log data being written to the working buffer (e.g., such that new event log data being written to the working buffer can trigger (e.g., immediately) writing the new event log data from the working buffer to the current file chunk).

Figure 3D:
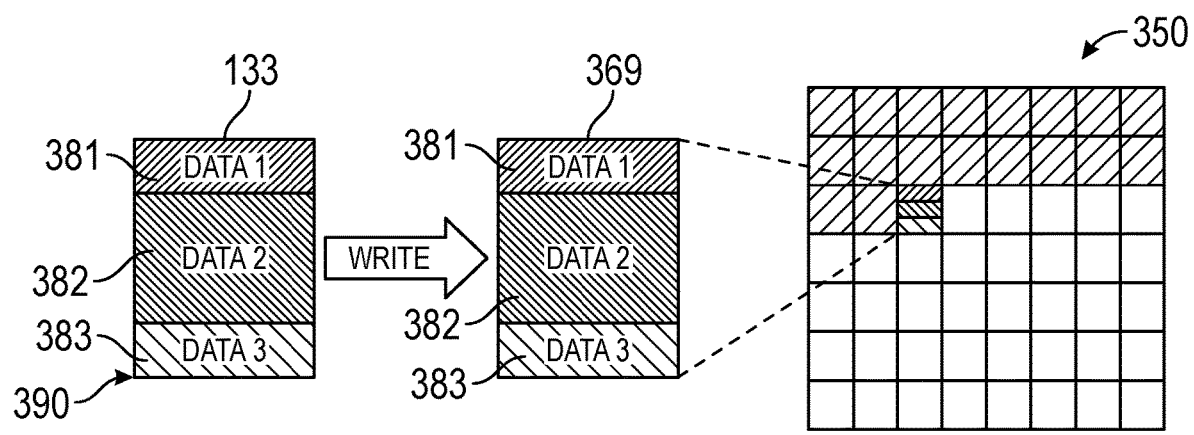

If the routine 240 determines that the working buffer is not full and that a write buffer trigger has not occurred (block 245: No), the routine 240 can return to block 243. For example, referring to FIG. 3D, the routine 240 determines that the buffer 133 is not full after writing the event log data 382 to the buffer 133 and that a write buffer trigger has not occurred. The routine 240 then returns to block 243 to write new event log data 383 to the buffer 133, updates the accumulator location pointer 390 at block 244 to reference an end of the event log data in the buffer 133, and again determines whether the working buffer is full and whether a write buffer trigger has occurred at block 245. As shown in FIG. 3D, after the new event log data 383 is written to the buffer 133, the accumulator location pointer 390 is updated such that it references the end of the buffer 133. Thus, the routine 240 of FIG. 2 can determine that the working buffer is full (block 245: Yes), and can proceed to block 246. The routine 240 may also proceed to block 246 whenever the routine 240 determines that a write buffer trigger has occurred (block 245: Yes).

At block 246, the routine 240 of FIG. 2 continues by writing the event log data stored in the working buffer to the current file chunk of the event log file. Referring again to FIG. 3C as an example, in the event the routine 240 determines that a write buffer trigger has occurred (block 245: Yes) after the new event log data 382 is written to the working buffer 133 at block 243, the routine 240 can write both the event log data 381 and the new event log data 382 from the buffer 133 to the current file chunk 369 of the event log file 350. Writing both the event log data 381 and the new event log data 382 to the current file chunk 369 can include rewriting or overwriting the event log data 381 that was already stored to the current file chunk 369 (illustrated in FIG. 3A). In other embodiments, the routine 240 can write just the new event log data 382 to memory cells of the current file chunk 369 that are physically or logically contiguous to memory cells of the current file chunk 369 storing the event log data 381. For example, in embodiments in which the storage capacity of the buffer 133 corresponds to the storage capacity of the current file chunk 369, the routine 240 can use the accumulator location pointer 390 of FIG. 3B (e.g., the value of the accumulator location pointer 390 before it is updated at block 244) to write the new event log data 382 from the buffer 133 to the current file chunk 369 such that event log data 381 and the new event log data 382 are consolidated within the current file chunk 369. In some embodiments, when the routine 240 proceeds to block 246 before the working buffer is full (e.g., upon the occurrence of a write buffer trigger), the routine 240 can return to block 243 or may proceed to block 247. Returning to block 243 in lieu of proceeding to block 247 can better consolidate event log data in the event log file 350 because new event log data can be written to the current file chunk until the working buffer and the current file chunk are full, as opposed to being written to a next file chunk of the event log file 350 while space remains on the current file chunk.

Referring to FIG. 3D as another example, in the event the routine 240 determines that the working buffer 133 is full (block 245: Yes) after the event log data 383 is written to the working buffer 133 at block 243, the routine 240 can write the event log data 381, the event log data 382, and/or the event log data 383 from the buffer 133 to the current file chunk 369 of the event log file 350. Writing the event log data 381, the event log data 382, and/or the event log data 383 to the current file chunk 369 can include rewriting or overwriting event log data (e.g., the event log data 381 and/or the event log data 382) that was already stored to the current file chunk 369 (illustrated in FIGS. 3A and 3C). In other embodiments, the routine 240 can write just event log data (e.g., the event log data 382 and/or the event log data 383) that has not already been written to the current file chunk 369, to memory cells of the current file chunk 369 that are physically or logically contiguous to memory cells of the current file chunk 369 already storing event log data. The routine 240 of FIG. 2 may then proceed to block 247.

At block 247, the routine 240 continues by updating the current file chunk index and resetting (e.g., erasing or clearing) the working buffer. In some embodiments, updating the current file chunk index can include incrementing the current file chunk index such that the current file chunk index references a next file chunk of the event log file. For example, the current file chunk index can be configured to step through the event log file, file chunk-by-file chunk. Thus, incrementing the current file chunk index can update the current file chunk index to point to or reference a next file chunk of the event log file in a (e.g., predetermined) sequence of file chunks.

In these and other embodiments, updating the current file chunk can include updating the current file chunk using a next file chunk index stored on the memory device. The next file chunk index can be a pointer that references the location of a next file chunk in the event log file and/or in the main memory of the memory device. In some embodiments, the next file chunk index can be stored in non-volatile memory (e.g., the main memory) of the memory device such that the next file chunk index can persist in the non-volatile memory after the memory device is powered down. In these and other embodiments, the next file chunk index can be stored in volatile memory of the memory device. For example, the routine 240 (*a*) can scan the main memory to locate the current file chunk of the event log file (e.g., by locating an end of the event log data); (b) can set the next file chunk index to reference a file chunk following the identified current file chunk (or another file chunk including a portion of memory that is not currently being used to store valid or non-stale event log data); and/or (c) can store the next file chunk index in volatile memory. The next file chunk index can be set upon power up of the memory device, such as during initialization of the memory device. To update the current file chunk index using the next file chunk index, the routine 240 can (a) set the current file chunk index equal to the next file chunk index and (b) increment or otherwise update the next file chunk index to point to or reference another (e.g., unutilized) file chunk of the event log data. Updating the current file chunk index using a next file chunk index permits the routine 240 greater flexibility to write event log data from the buffer to the event log file in any sequence of file chunks (e.g., not just to a logical or physical order of the file chunks of the event log file).

Figure 3E:
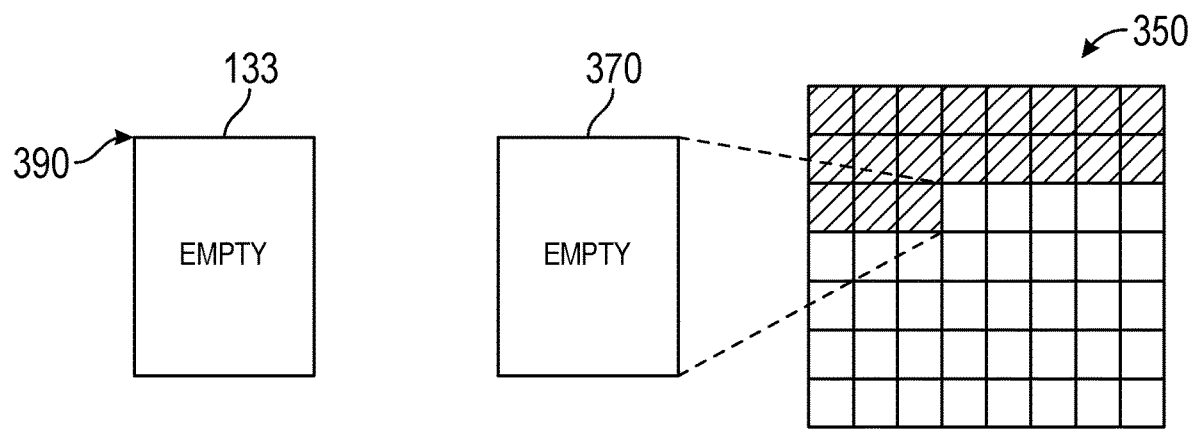

For the sake of clarity and understanding, an example of block 247 of the routine 240 is illustrated in FIG. 3E. More specifically, after the routine 240 determines (e.g., using the updated accumulator location pointer 390 of FIG. 3D) that the buffer 133 is full and writes the next event log data 383 (FIG. 3D) from the buffer 133 to the current file chunk 369, the routine 240 (*a*) can update the current file chunk index to reference a next file chunk 370 of the event log file 350 as the current file chunk and (b) can reset the buffer 133. In some embodiments, the routine 240 can update the accumulator location pointer 390 to reference a physical or logical beginning of the buffer 133 when the routine 240 resets the buffer 133. Additionally, or alternatively, the routine 240 can return to block 241, block 242, or block 243 after updating the current file chunk and resetting the buffer 133 at block 247.

Although the blocks of the routine 240 are discussed and illustrated in a particular order, the routine 240 of FIG. 2 is not so limited. In other embodiments, the blocks of the routine 240 can be performed in a different order. In these and other embodiments, any of the blocks of the routine 240 can be performed before, during, and/or after any of the other blocks of the routine 240. For example, all or a subset of the block 246 can be performed before or during all or a subset of block 244 and/or block 245. As a specific example, the routine 240 can write event log data (e.g., the event log data 382 (FIG. 3C)) from the working buffer to the current file chunk before determining or while determining whether the working buffer is full or a write buffer trigger has occurred. As another example, all or a subset of the block 245 can be performed before, during, or after any of the other blocks of the routine 240. For example, the routine 240 can determine whether a write buffer trigger has occurred at any time. Furthermore, a person skilled in the art will readily recognize that the routine 240 can be altered and still remain within these and other embodiments of the present technology. For example, one or more blocks of the routine 240 can be omitted and/or repeated in some embodiments.

Figure 4:
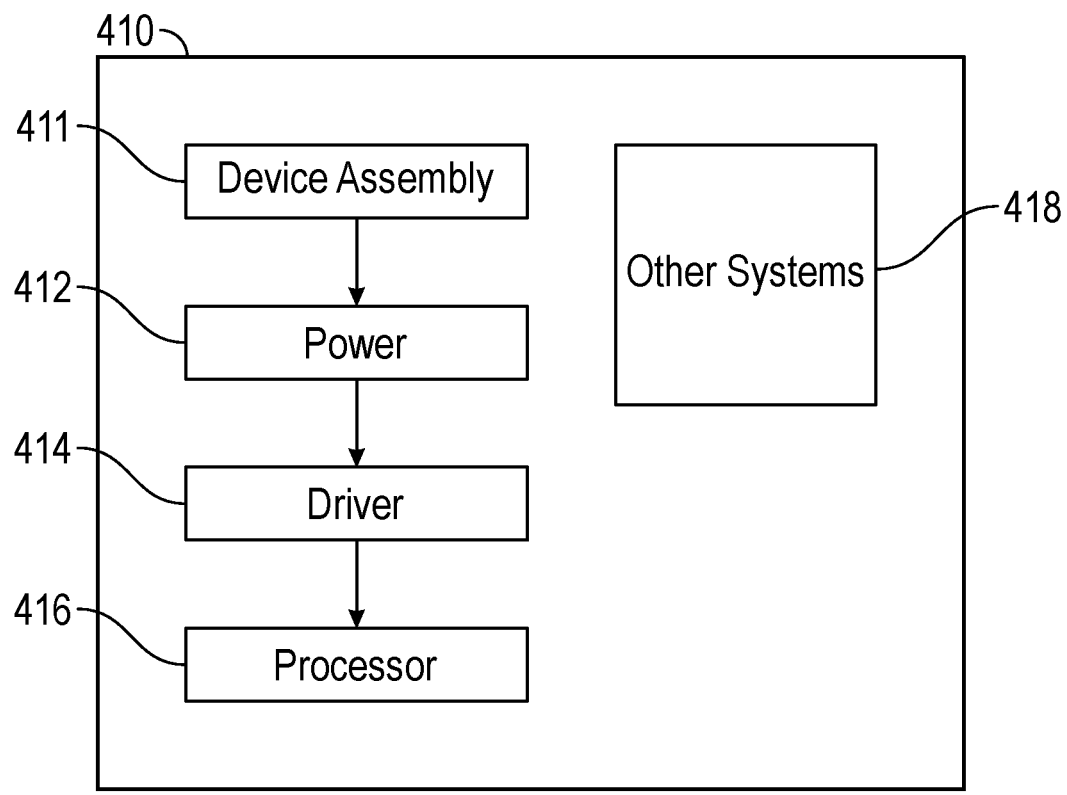
FIG. 4 is a partial schematic block diagram of a system that includes a memory device configured in accordance with various embodiments of the present technology.

FIG. 4 is a schematic view of a system that includes a memory device in accordance with various embodiments of the present technology. Any one of the foregoing memory devices described above with reference to FIGS. 1-3E can be incorporated into any of a myriad of larger and/or more complex systems, a representative example of which is system 410 shown schematically in FIG. 4. The system 410 can include a semiconductor device assembly 411, a power source 412, a driver 414, a processor 416, and/or other subsystems and components 418. The semiconductor device assembly 411 can include features generally similar to those of the memory devices described above with reference to FIGS. 1-3E, and can, therefore, include various features of efficiently storing event log data. The resulting system 410 can perform any of a wide variety of functions, such as memory storage, data processing, and/or other suitable functions. Accordingly, representative systems 410 can include, without limitation, hand-held devices (e.g., mobile phones, tablets, digital readers, and digital audio players), computers, vehicles, appliances, and other products. Components of the system 410 may be housed in a single unit or distributed over multiple, interconnected units (e.g., through a communications network). The components of the system 410 can also include remote devices and any of a wide variety of computer-readable media.

C. CONCLUSION

From the foregoing, it will be appreciated that specific embodiments of the technology have been described herein for purposes of illustration, but well-known structures and functions have not been shown or described in detail to avoid unnecessarily obscuring the description of the embodiments of the technology. Where the context permits, singular or plural terms can also include the plural or singular term, respectively. Moreover, unless the word "or" is expressly limited to mean only a single item exclusive from the other items in reference to a list of two or more items, then the use of "or" in such a list is to be interpreted as including (a) any single item in the list, (b) all of the items in the list, or (c) any combination of the items in the list. As used herein, the phrase "and/or" as in "A and/or B" refers to A alone, B alone, and both A and B. Additionally, the terms "comprising," "including," "having," and "with" are used throughout to mean including at least the recited feature(s) such that any greater number of the same feature(s) and/or additional types of other features are not precluded. Moreover, the terms "connect" and "couple" are used interchangeably herein and refer to both direct and indirect connections or couplings. For example, where the context permits, element A "connected" or "coupled" to element B can refer (i) to A directly "connected" or directly "coupled" to B and/or (ii) to A indirectly "connected" or indirectly "coupled" to B.

The above detailed descriptions of embodiments of the technology are not intended to be exhaustive or to limit the technology to the precise form disclosed above. Although specific embodiments of, and examples for, the technology are described above for illustrative purposes, various equivalent modifications are possible within the scope of the technology, as those skilled in the relevant art will recognize. For example, while steps are presented in a given order, alternative embodiments can perform steps in a different order. As another example, various components of the technology can be further divided into subcomponents, and/or various components and/or functions of the technology can be combined and/or integrated. Furthermore, although advantages associated with certain embodiments of the technology have been described in the context of those embodiments, other embodiments can also exhibit such advantages, and not all embodiments need necessarily exhibit such advantages to fall within the scope of the present technology.

It should also be noted that other embodiments in addition to those disclosed herein are within the scope of the present technology. For example, embodiments of the present technology can have different configurations, components, and/or procedures in addition to those shown or described herein. Moreover, a person of ordinary skill in the art will understand that these and other embodiments can be without several of the configurations, components, and/or procedures shown or described herein without deviating from the present technology. Accordingly, the disclosure and associated technology can encompass other embodiments not expressly shown or described herein.

What is claimed is:

1. A method, comprising:
   identifying, using a current file chunk index, a current file chunk of an event log file of a memory device, wherein the current file chunk is one of a plurality of file chunks of the event log file, is a subregion of the event log file that corresponds to an end of event log data stored to the event log file, and includes unutilized portions of the event log file, and wherein the current file chunk index is a pointer that references a location of the current file chunk in the event log file;
   after identifying the current file chunk, reading first event log data into a working buffer, wherein the first event log data includes current event log data stored to the current file chunk;
   after reading the first event log data into the working buffer, writing second event log data to the working buffer such that the first event log data and the second event log data are consolidated within the working buffer; and
   writing the first event log data and the second event log data from the working buffer to the current file chunk of the event log file of the memory device such that the first event log data and the second event log data are consolidated within the current file chunk.

2. The method of claim 1, further comprising, after reading the first event log data into the working buffer and before writing the second event log data to the working buffer, setting an accumulator location pointer to reference an end of the first event log data in the working buffer.

3. The method of claim 2, wherein:
   the method further comprises, after reading the first event log data into the working buffer and before writing the second event log data to the working buffer, scanning the working buffer to identify the end of the first event log data in the working buffer; and
   setting the accumulator location pointer includes setting the accumulator location pointer based at least in part on the scan.

4. The method of claim 1, wherein reading the first event log data into the working buffer includes reading the first event log data into the working buffer upon power up of the memory device.

5. The method of claim 1, wherein writing the first event log data and the second event log data from the working buffer to the current file chunk includes:
writing the first event log data and the second event log data from the working buffer to the current file chunk a scheduled time after writing the current event log data to the working buffer.

6. The method of claim 1, wherein writing the first event log data and the second event log data from the working buffer to the current file chunk includes:
writing the first event log data and the second event log data from the working buffer to the current file chunk when a total size or a total amount of the first event log data and the second event log data stored to the working buffer exceeds a threshold amount.

7. The method of claim 1, wherein writing the first event log data and the second event log data from the working buffer to the current file chunk includes writing the first event log data and the second event log data from the working buffer to the current file chunk when the working buffer is full.

8. The method of claim 1, wherein writing the first event log data and the second event log data from the working buffer to the current file chunk includes writing the first event log data and the second event log data from the working buffer to the current file chunk upon power down of the memory device or in response to a power loss event of the memory device.

9. The method of claim 1, wherein writing the first event log data and the second event log data from the working buffer to the current file chunk includes writing the first event log data and the second event log data from the working buffer to the current file chunk in response to receiving, from a host device operably connected to the memory device, a request for the event log data stored to the event log file.

10. The method of claim 1, wherein writing the first event log data and the second event log data from the working buffer to the current file chunk includes writing the first event log data and the second event log data from the working buffer to the current file chunk in response to determining that the memory device is idle.

11. The method of claim 1, further comprising:
after writing the second event log data to the working buffer, determining that the working buffer is full or that a write buffer trigger has occurred; and
in response to determining that the working buffer is full or that a write buffer trigger has occurred, clearing the working buffer and updating the current file chunk index stored to the memory device to reference a next file chunk of the plurality of file chunks as a new current file chunk, wherein the new current file chunk is another subregion of the event log file that (i) corresponds to the end of the event log data stored to the event log file after writing the second event log data to the current file chunk and (ii) includes unutilized portions of the event log file.

12. The method of claim 11, wherein updating the current file chunk index includes (a) setting the current file chunk index equal to a next file chunk index stored to the memory device and (b) updating the next file chunk index to reference a second file chunk, wherein the second file chunk is an unutilized file chunk of the plurality of file chunks.

13. The method of claim 1, further comprising:
after writing the second event log data to the working buffer, determining that the working buffer is not full; and
after determining that the working buffer is not full,
writing third event log data to the working buffer such that the first event log data, the second event log data, and the third event log data are consolidated within the working buffer, wherein the third event log data is new event log data generated at a different timing from the second event log data and the first event log data,
after writing the third event log data to the working buffer, writing the third event log data from the working buffer to the current file chunk when writing the first event log data and the second event log data to the current file chunk such that the first event log data, the second event log data, and the third event log data are consolidated within the current file chunk, and
updating an accumulator location pointer to reference an end of the third event log data in the working buffer.

14. The method of claim 1, wherein writing the first event log data and the second event log data from the working buffer to the current file chunk includes writing the first event log data and the second event log data from the working buffer to the current file chunk immediately after writing the second event log data to the working buffer.

15. The method of claim 1, wherein writing the first event log data and the second event log data from the working buffer to the current file chunk includes writing the first event log data and the second event log data from the working buffer to the current file chunk when a size or amount of the second event log data exceeds a threshold amount.

16. At least one non-transitory computer-readable medium having instructions stored thereon that, when executed by at least one processor of a memory system, cause the memory system to perform a method comprising:
identifying, using a current file chunk index, a current file chunk of an event log file of a memory device, wherein the current file chunk is one of a plurality of file chunks of the event log file, is a subregion of the event log file that corresponds to an end of event log data stored to the event log file, and includes unutilized portions of the event log file, and wherein the current file chunk index is a pointer that references a location of the current file chunk in the event log file;
after identifying the current file chunk, reading first event log data into a working buffer, wherein the first event log data includes current event log data stored to the current file chunk;
after reading the first event log data into the working buffer, writing second event log data to the working buffer, wherein the second event log data include new event log data generated at a different timing from the first event log data; and
writing the second event log data from the working buffer to the current file chunk of the event log file of the memory system such that the first event log data and the second event log data are consolidated within the current file chunk.

17. The at least one non-transitory computer-readable medium of claim 16, wherein the method further comprises:

before writing the second event log data to the working buffer, setting an accumulator location pointer to reference an end of the first event log data in the working buffer.

18. A memory device, comprising:
a non-volatile memory subsystem storing a persistent event log file; and
a volatile memory subsystem including a working buffer, wherein the memory device is configured to:
   identify, using a current subregion index, a current subregion of the persistent event log file, wherein the current subregion is one of a plurality of subregions of the persistent event log file, corresponds to an end of event log data stored to the persistent event log file, and includes unutilized portions of the persistent event log file, and wherein the current subregion index is a pointer that references a location of the current subregion in the persistent event log file;
   after identifying the current subregion, read first event log data into the working buffer, wherein the first event log data includes current event log data stored to the current subregion;
   after reading the first event log data into the working buffer, write second event log data of the memory device to the working buffer such that the first event log data and the second event log data are consolidated within the working buffer, wherein the second event log data includes new event log data generated at a different timing from the first event log data; and
   write the second event log data from the working buffer to the current subregion of the persistent event log file such that the first event log data and the second event log data are consolidated within the current subregion.

19. The memory device of claim 18, further comprising a controller operably connected to the non-volatile memory subsystem, wherein the working buffer is positioned in the controller.

20. The memory device of claim 18, further comprising a controller operably connected to the non-volatile memory subsystem, wherein the working buffer is positioned outside of the controller.

* * * * *